United States Patent
Cronin et al.

(10) Patent No.: US 10,262,311 B1
(45) Date of Patent: Apr. 16, 2019

(54) NFC-BASED PAYMENTS TAGGING

(71) Applicant: Blazer and Flip Flops, Inc., San Diego, CA (US)

(72) Inventors: John Cronin, Bonita Springs, FL (US); Seth Melvin Cronin, Clarksville, TN (US)

(73) Assignee: BLAZER AND FLIP FLOPS, INC., San Diego, CA (US)

( * ) Notice: Subject to any disclaimer, the term of this patent is extended or adjusted under 35 U.S.C. 154(b) by 0 days.

(21) Appl. No.: 14/970,328

(22) Filed: Dec. 15, 2015

Related U.S. Application Data (60) Provisional application No. 62/093,028, filed on Dec. 17, 2014.

(51) Int. Cl.
| | |
|---|---|
| *G06Q 20/20* | (2012.01) |
| *G06Q 20/32* | (2012.01) |
| *G06Q 20/10* | (2012.01) |
| G06K 5/00 | (2006.01) |
| G06F 3/0484 | (2013.01) |

(52) U.S. Cl.
CPC ......... *G06Q 20/202* (2013.01); *G06Q 20/102* (2013.01); *G06Q 20/3278* (2013.01); *G06F 3/04847* (2013.01)

(58) Field of Classification Search
USPC .......................................................... 705/21
See application file for complete search history.

(56) References Cited

U.S. PATENT DOCUMENTS

| | | | |
|---|---|---|---|
| 5,473,143 A | 12/1995 | Vak et al. | |
| 6,973,172 B1 | 12/2005 | Bitove et al. | |
| 7,828,204 B2 | 11/2010 | Fiebiger et al. | |
| 7,832,646 B1 | 11/2010 | Leason | |
| 7,844,512 B2 | 11/2010 | Richards et al. | |
| 8,065,190 B2 | 11/2011 | Collas et al. | |
| 8,105,772 B2 | 4/2012 | Mardikar et al. | |
| 8,306,860 B2 | 11/2012 | Dunsmore et al. | |
| 8,474,701 B1 | 7/2013 | Meek et al. | |
| 8,494,913 B2 | 7/2013 | Cavagnaro | |
| 8,498,900 B1 | 7/2013 | Spirin et al. | |
| 8,577,803 B2 | 11/2013 | Chatterjee et al. | |
| 8,690,054 B1 | 4/2014 | Cummins et al. | |
| 8,718,554 B2 | 5/2014 | Abel | |
| 8,762,211 B2 | 6/2014 | Killian et al. | |
| 8,783,561 B2 | 7/2014 | Wesley | |
| 8,799,085 B2 | 8/2014 | Fisher | |

(Continued)

FOREIGN PATENT DOCUMENTS

| | | |
|---|---|---|
| CN | 103679475 | 3/2014 |
| EP | 2 533 186 | 12/2012 |

(Continued)

OTHER PUBLICATIONS

Airplus—Mobile Payment—How It Will Transform Corporate Travel and Expense Management, Apr. 18, 2012.

(Continued)

*Primary Examiner* — Garcia Ade
(74) *Attorney, Agent, or Firm* — Polsinelli LLP (57) ABSTRACT

The present invention communicates with a point of sale terminal using near field data communications and a purchase is either allowed or denied by a billing statement network according to a set of parameters.

20 Claims, 11 Drawing Sheets

(56) References Cited

U.S. PATENT DOCUMENTS

| | | | |
|---|---|---|---|
| 8,805,726 B2 | 8/2014 | Fisher | |
| 8,811,895 B2 | 8/2014 | Reisgies et al. | |
| 8,954,004 B1 | 2/2015 | Wang et al. | |
| 9,582,826 B2* | 2/2017 | Calnnan | G06Q 30/0639 |
| 9,646,303 B2 | 5/2017 | Karpenko et al. | |
| 9,734,091 B2* | 8/2017 | Kadi | G06F 12/1408 |
| 9,985,699 B1 | 5/2018 | Cronin | |
| 2002/0026348 A1 | 2/2002 | Fowler et al. | |
| 2002/0062249 A1 | 5/2002 | Iannacci | |
| 2004/0010597 A1 | 1/2004 | Kirschner et al. | |
| 2004/0220876 A1 | 11/2004 | Liu | |
| 2005/0210240 A1 | 9/2005 | Barron | |
| 2006/0131390 A1 | 6/2006 | Kim | |
| 2006/0206378 A1 | 9/2006 | Ficalora | |
| 2007/0022375 A1 | 1/2007 | Walker | |
| 2008/0011837 A1 | 1/2008 | Wesley | |
| 2008/0109335 A1 | 5/2008 | Keohane et al. | |
| 2008/0120155 A1 | 5/2008 | Pliha | |
| 2008/0133351 A1 | 6/2008 | White et al. | |
| 2008/0147496 A1 | 6/2008 | Bal et al. | |
| 2008/0150678 A1 | 6/2008 | Giobbi et al. | |
| 2008/0167017 A1 | 7/2008 | Wentker et al. | |
| 2008/0167961 A1 | 7/2008 | Wentker et al. | |
| 2009/0132362 A1 | 5/2009 | Fisher et al. | |
| 2009/0138365 A1 | 5/2009 | Mueller et al. | |
| 2009/0156190 A1 | 6/2009 | Fisher | |
| 2009/0192935 A1 | 7/2009 | Griffin et al. | |
| 2009/0276305 A1 | 11/2009 | Clopp | |
| 2010/0010887 A1 | 1/2010 | Karlin et al. | |
| 2010/0114677 A1 | 5/2010 | Carlson et al. | |
| 2010/0125510 A1 | 5/2010 | Smith et al. | |
| 2010/0190437 A1 | 7/2010 | Buhot | |
| 2010/0211507 A1 | 8/2010 | Aabye et al. | |
| 2010/0211679 A1 | 8/2010 | Kumar et al. | |
| 2010/0274691 A1 | 10/2010 | Hammad et al. | |
| 2010/0274853 A1 | 10/2010 | Carlson et al. | |
| 2010/0312692 A1 | 12/2010 | Teicher | |
| 2011/0016050 A1 | 1/2011 | Evans | |
| 2011/0153438 A1 | 6/2011 | Dragt | |
| 2011/0167133 A1 | 7/2011 | Jain | |
| 2011/0202402 A1 | 8/2011 | Fowler et al. | |
| 2011/0218849 A1 | 9/2011 | Rutigliano et al. | |
| 2012/0036076 A1 | 2/2012 | Vanderwall et al. | |
| 2012/0078701 A1 | 3/2012 | Woods | |
| 2012/0078735 A1 | 3/2012 | Bauer et al. | |
| 2012/0089461 A1 | 4/2012 | Greenspan | |
| 2012/0101882 A1 | 4/2012 | Todd | |
| 2012/0109730 A1 | 5/2012 | Yoder et al. | |
| 2012/0136732 A1 | 5/2012 | McMillen et al. | |
| 2012/0160912 A1 | 6/2012 | Laracey | |
| 2012/0166332 A1 | 6/2012 | Naaman | |
| 2012/0185315 A1 | 7/2012 | VanDerheide et al. | |
| 2012/0209749 A1 | 8/2012 | Hammad et al. | |
| 2012/0221401 A1 | 8/2012 | Brown et al. | |
| 2012/0253913 A1 | 10/2012 | Richard | |
| 2012/0330744 A1 | 12/2012 | Aissa | |
| 2013/0006773 A1 | 1/2013 | Lutnick et al. | |
| 2013/0006782 A1 | 1/2013 | Schwarzkopf et al. | |
| 2013/0020389 A1* | 1/2013 | Barnett | G06Q 20/204 235/380 |
| 2013/0059534 A1 | 3/2013 | Sobalvarro et al. | |
| 2013/0080241 A1 | 3/2013 | Fisher | |
| 2013/0085835 A1 | 4/2013 | Horowitz | |
| 2013/0095755 A1 | 4/2013 | Moreton et al. | |
| 2013/0097040 A1 | 4/2013 | Fisher | |
| 2013/0110682 A1 | 5/2013 | Rosenblatt et al. | |
| 2013/0132282 A1 | 5/2013 | Shakkarwar | |
| 2013/0144715 A1 | 6/2013 | Kranzley et al. | |
| 2013/0191213 A1 | 7/2013 | Beck et al. | |
| 2013/0204728 A1 | 8/2013 | Lichterman et al. | |
| 2013/0211987 A1 | 8/2013 | Louie et al. | |
| 2013/0218682 A1 | 8/2013 | Alterman et al. | |
| 2013/0268378 A1 | 10/2013 | Yovin | |
| 2014/0006205 A1 | 1/2014 | Berry et al. | |
| 2014/0006272 A1 | 1/2014 | Calman et al. | |
| 2014/0074637 A1 | 3/2014 | Hammad | |
| 2014/0074691 A1 | 3/2014 | Bank et al. | |
| 2014/0081855 A1 | 3/2014 | Hankins et al. | |
| 2014/0089178 A1 | 3/2014 | Lee et al. | |
| 2014/0100983 A1 | 4/2014 | Cavagnaro | |
| 2014/0138435 A1 | 5/2014 | Khalid | |
| 2014/0172660 A1 | 6/2014 | Louie et al. | |
| 2014/0189836 A1 | 7/2014 | Eyler | |
| 2014/0207680 A1 | 7/2014 | Rephlo | |
| 2014/0214673 A1 | 7/2014 | Baca et al. | |
| 2014/0222670 A1 | 8/2014 | Concannon | |
| 2014/0274014 A1 | 9/2014 | Dodla | |
| 2014/0279474 A1 | 9/2014 | Evans et al. | |
| 2014/0298027 A1 | 10/2014 | Roberts et al. | |
| 2014/0351057 A1 | 11/2014 | Kwon et al. | |
| 2014/0351071 A1 | 11/2014 | Hong et al. | |
| 2014/0351147 A1 | 11/2014 | Castrechini et al. | |
| 2015/0019439 A1 | 1/2015 | Phillips | |
| 2015/0095224 A1 | 4/2015 | Blythe | |
| 2015/0100443 A1 | 4/2015 | Vann Heerden et al. | |
| 2015/0120473 A1 | 4/2015 | Jung et al. | |
| 2015/0127549 A1 | 5/2015 | Khan | |
| 2015/0186871 A1 | 7/2015 | Laracey | |
| 2015/0302398 A1 | 10/2015 | Desai et al. | |
| 2015/0339318 A1 | 11/2015 | O'Toole et al. | |
| 2015/0356551 A1 | 12/2015 | Dogin et al. | |
| 2016/0057619 A1 | 2/2016 | Lopez | |
| 2016/0117667 A1 | 4/2016 | Kang et al. | |
| 2016/0162882 A1 | 6/2016 | McClung | |
| 2016/0321641 A1 | 11/2016 | Cady et al. | |
| 2017/0024733 A1 | 1/2017 | Purves | |

FOREIGN PATENT DOCUMENTS

| | | |
|---|---|---|
| WO | WO 2012/051071 | 4/2012 |
| WO | WO 2013/096486 | 6/2013 |

OTHER PUBLICATIONS

Case Study—Bill Splitting App for Restaurantst, 2013.
AuthenTec—AuthenTec Fingerpring Technology Featured in Two New Fujitsu NFC-enabled Mobile Phones from NTT Docomo, Nov. 16, 2011.
Balaban, Dan; "Spanish Bank Installs 'First' Contactless ATMs", NFC Times, Apr. 5, 2011.
Blaze Mobile Wallet, Jan. 2008.
Boden, Rian; "PrivatBank cuts ATM costs with NFC", NFC World, Nov. 5, 2013.
Borison, Rebecca; "Google Wallet adds geolocated loyalty to iOS, combats Passbook", Mobile Commerce Daily, Feb. 7, 2014.
Carson, Biz; "BitPay brings one-touch payments to bitcoin with new NFC-compatible checkout app." Nov. 4, 2014.
Cluckey, Suzanne; "New guide offers a comprehensive view of ATM and mobile integration", Mobile Payments Today, Nov. 28, 2014.
CommBank Small Business app User Guide, CommonwealthBank. Jul. 11, 2014.
Dai, Weihui; "An Integrated Mobile Phone Payment System Based on 3G Network", Journal of Networks, vol. 6, No. 9, Sep. 2011.
Dragt, Bruce; "Universal Commerce: A Seamless, Personalized Purchase Experience for Today's Connected Consumers", A First Data White Paper, 2012.
Fraser, Jeff; "The Mobile Shopper: Lose Your Wallet." Jun. 1, 2014.
Girt Mobile—Mobile Application Development Ireland, Dec. 2, 2014.
Google Wallet Privacy Policy, Nov. 16, 2011.
Hoyos Labs, Nov. 28, 2014.
I-Free Unveils New and Improved "Wallet": NFC Mobile App Now Stores Contactless Transport Cards and Discount Coupons, i-Free News, Nov. 7, 2013.
FAQ and Support—CashCloud.com, Dec. 3, 2014.
Itautec Mobicash, Feb. 13, 2013. Link: https://youtu.be/-qaL2QHliok (youtube video, no pdf).
Khan, Vaseem; "Contactless card reader by Diebold leverages NFC technology at ATM's to give cash", NFC Payments, Oct. 10, 2013.

(56) References Cited

OTHER PUBLICATIONS

Keane, Byran; "Key Takeaways From Money2020 Industry Conf", Deutsche Bank Markets Research. Oct. 10, 2013.
Lawler, Ryan; "Square's Order App Can Now Predict When You'll Arrive to Pick Up Your Cappuccino", TechCrunch, Oct. 8, 2014.
Ma et al., Xiaohua; "The Architecture of Mobile Wallet System Based on NFC (Near Field Communication)", Research Journal of Applied Sciences, Engineering and Technology 7(12):2589-2595, 2014, ISSN: 2040-7459; e-ISSN: 2040-7467, Mar. 29, 2014.
Mastin, Michelle; "Square vs.. Intuit GoPayment: Mobile Credit Card Systems Compared", BIZFEED, PCWorld, Sep. 6, 2011.
Mobile_Commerce_NFC_Coupons_and Loyalty_Acceptance—Technical Proposal, Version 1.0, Jul. 1, 2014.
More Magic: Mobile Banking & Payment Applications, Nov. 30, 2014.
NEC—Integrated E-Money Solution, Jan. 20, 2014.
"New breed of ATM Visits Times Square", Mobileinfo.com, Issue #2001, Jul. 30, 2001.
NFC & Contactless—Mobile and card solutions, NFC & Mobile Money Summit, Oct. 14-17, 2013.
NFC ReTag Free—WidgApp Mobile Solutions Tools, Google Play, Jul. 17, 2014.
NFC White Paper—Alcatel-Lucent Mobile Wallet Service, Dec. 2011.
NXP—NFC for embedded applications: Your Critical link for the Internet of Things, Aug. 21, 2014.
Patni, Chandra; "Pouch NFC PayPass & PayWave Card Issuance, pouch-let your mobile pay!", www.yes-wallet.com, Apr. 13, 2012.
"Pay2You Places: shopping by geolocation", Connexions, Jul. 5, 2013.
Pourghomi et al., Pardis; "Cloud-based NFC Mobile Payments", Journal of Internet Technology and Secured Transactions (JITST), vol. 2, Issues 1/2/3/4, Mar.-Dec. 2013.
Pourghomi et al., Pardis; "A Proposed NFC Payment Application", International Journal of Advanced Computer Science and Applications, vol. 4, No. 8, 2013).
Reardon, Marguerite; Tibken, Shara; "Apple takes NFC mainstream on iPhone 6; Apple Watch with Apple Pay", CNET, Sep. 9, 2014.
Rodrigues et al., Helena; "MobiPag: Integrated Mobile Payment, Ticketing and Couponing Solution Based on NFC", Sensors 2014, 14, 13389-13415;ISSN 124-8220, Jul. 24, 2014.
Sreekumar, Shiny; "Biometric Authentication in Mobile Payments", Master Thesis, Information Management, Faculty of Computer Sciences, Sep. 2010.
Tamas, Fabian; "NFC-enabled Automated Teller Machine", Obuda University, NIK. Nov. 28, 2014.
TapWise—Near Field Communication (NFC) Services and Cloud-Based Tag Management, Dec. 1, 2014.
VoxLoc—Mastercard announces high level of success with biometric system. Sep. 23, 2014.
White Paper—Beyond the Hype: Mobile Payments for Merchants, 2013.
White Paper—Cloud Based Ticketing: Next Generation Fare Collection, Mar. 23, 2014.
White Paper—Mobile Commerce in Retail: Loyalty and Couponing, Jan. 2014.
White Pater—The Role of the Trusted Service Manager in Mobile Commerce, Dec. 2013.
Wollenhaupt, Gary; "Five Ways Mobile Technology will Revolutionize ATMs", White Paper—ATM MarketPlace, 2013.
U.S. Appl. No. 14/970,102 Office Action dated May 1, 2017.
U.S. Appl. No. 14/970,304, John Cronin, NFC Transation Choices, filed Dec. 15, 2015.
U.S. Appl. No. 14/970,311, John Cronin, NFC Triggered Incentives at Point-of-Sale, filed Dec. 15, 2015.
U.S. Appl. No. 14/970,314, John Cronin, NFC Ubiquitous Modular Payment Terminal, filed Dec. 15, 2015.
U.S. Appl. No. 14/970,319, John Cronin, NFC ATM Vending Machine With Added Two Way Non-Financial Data, filed Dec. 15, 2015.
U.S. Appl. No. 14/970,056, John Cronin, NFC-Based Payment as a Service, filed Dec. 15, 2015.
U.S. Appl. No. 14/970,069, John Cronin, NFC Improving Content Transfer in Low Bandwidth NFC Payments Systems, filed Dec. 15, 2015.
U.S. Appl. No. 14/970,080, John Cronin, NFC Increased Biometrics Based on Transaction Parameters, filed Dec. 15, 2015.
U.S. Appl. No. 14/970,091, John Cronin, Interaction with Purchaser in NFC-Based Transaction, filed Dec. 15, 2015.
U.S. Appl. No. 14/970,102, John Cronin, NFC Center, filed Dec. 15, 2015.
U.S. Appl. No. 14/970,338, John Cronin, Payment Process with Warranty Options, filed Dec. 15, 2015.
U.S. Appl. No. 14/970,340, John Cronin, Real Time Credit Offers, filed Dec. 15, 2015.
U.S. Appl. No. 14/970,125, John Cronin, NFC Transactions with Financial and Non-Financial Data, filed Dec. 15, 2015.
U.S. Appl. No. 14/970,139, John Cronin, Bill Splitting and Account Delegation for NFC, filed Dec. 15, 2015.
U.S. Appl. No. 14/970,144, John Cronin, Automatic Shopping Based on Historical Data, filed Dec. 15, 2015.
U.S. Appl. No. 14/970,102 Final Office Action dated Nov. 30, 2017.
U.S. Appl. No. 15/967,068, John Cronin, Managing NFC Data, filed Apr. 30, 2018.
U.S. Appl. No. 14/970,311 Office Action dated Apr. 4, 2018.
U.S. Appl. No. 14/970,319 Office Action dated Jun. 26, 2018.
U.S. Appl. No. 14/970,056 Office Action dated Apr. 5, 2018.
U.S. Appl. No. 14/970,091 Office Action dated Jun. 1, 2018.
U.S. Appl. No. 14/970,340 Office Action dated Apr. 5, 2018.
U.S. Appl. No. 14/970,139 Office Action dated May 31, 2018.
U.S. Appl. No. 14/970,144 Office Action dated May 17, 2018.
U.S. Appl. No. 14/970,304 Office Action dated Jan. 12, 2018.
U.S. Appl. No. 14/970,314 Office Action dated Mar. 8, 2018.
U.S. Appl. No. 14/970,069 Office Action dated Mar. 28, 2018.
U.S. Appl. No. 14/970,080 Office Action dated Feb. 26, 2018.
U.S. Appl. No. 14/970,338 Office Action dated Jun. 28, 2018.
U.S. Appl. No. 14/970,125 Office Action dated Jun. 29, 2018.
U.S. Appl. No. 14/970,056 Final Office Action dated Nov. 2, 2018.

* cited by examiner

User Device Statement Graphic User Interface (GUI)

Bank Statement

Account Summary
Account Number: XXXXXXXXXXXXXX

Previous Balance
Payment Credits
Purchases
NFC Purchases
Transfers
Fees
Interest
New Balance

Payment Information
Credit Card ending in: x5555
Debit Card Ending in: x4444
NFC on Bob's iPhone 6
NFC on Barbara's Android Tablet

Account Activity

| Date | Merchant Name or Transaction Description | ID | Device | GPS Location | $ Amount | View Image |
|---|---|---|---|---|---|---|
| 11-Nov | Starbuck's Coffe | XXXXXX1 | NFC - Bob's iPhone | [xx,yy] | $5.00 | image1 |
| 11-Nov | Shaw's Grocery | XXXXXX2 | NFC - Barbara's Android | [xx,yy] | $250 | image2 |
| 11-Nov | Exxon Mobil Gasoline | XXXXXX3 | Credit Card | N/A | $25.50 | N/A |
| 12-Nov | Denny's Diner | XXXXXX4 | Debit Card | N/A | $15.50 | N/A |

[Download Statement to Quicken] [View/Change NFC Rules] [View NFC Map GUI]

NFC-BASED PAYMENTS TAGGING

CROSS-REFERENCE TO RELATED APPLICATIONS

The present application claims the priority benefit of U.S. provisional application No. 62/093,028 filed Dec. 17, 2014 entitled "Payments Data Source Tagging for Accounts Statements," the disclosure of which is hereby incorporated by reference.

BACKGROUND

Field of the Invention

The present invention generally relates to near field communications (NFC). More specifically, the present invention relates to a user of a user electronic device equipped with a near field data communication interface that performs financial transactions at point of sale terminals according to set of parameters configured at a billing statement network.

Description of the Related Art

Near field data communications (NFC) are currently being used by consumers to make secure financial transactions when purchasing goods or services. NFC is a standardized wireless data communication technology that communicates information over short distances. NFC commonly communicates using a frequency of 13.56 megahertz (MHz) with data rates approaching 424 kilo-bits per second (Kbps/sec). NFC equipped devices of various sorts are available in the marketplace today.

Users of NFC equipped devices currently cannot view a statement that identifies details of purchases made using their user device. Users of NFC data communication interface equipped user device are also currently without a way to setup rules that govern whether an item may be purchased by a particular user device using NFC data communications. Furthermore, there is no systematic way for users of a user device to keep track of NFC purchases with pictures and/or annotations made at the time of the purchase.

There is a need in the art for a system and method where a user device allows for identification, tracking, annotation, and photographing of information relating to purchases made using a near field data communication interface on a mobile device. Such a system and method would allow the user monitor purchase activity by viewing a statement, and would allow a user to regulate purchase activity of the user device according to a set of rules stored in a remote location.

SUMMARY OF THE PRESENTLY CLAIMED INVENTION

Embodiments of the present invention include a system and a method for tracking financial transactions using mobile electronic devices equipped with a near field communication (NFC) data communication interface. A method of the present invention may include a user entering information relating to a financial account into a graphical user interface displayed on a display at a mobile electronic device. The information entered may then be transmitted over a data communication interface to a billing statement network that responds by sending billing statement information back to the user device, and the billing statement information may then be received by the user device over the data communication interface. The billing statement information from the billing statement network may be displayed in a graphical user interface (GUI) on a display at the user device. In certain instances the billing statement information is displayed according to a set of settings or parameters set by the user of the user device at an earlier time. The billing statement information may also identify purchases that were purchased over a NFC data communication interface.

DETAILED DESCRIPTION

Embodiments of the present invention include a system and a method for processing payments at private enterprises using mobile electronic devices equipped with near field data communication (NFC) functionality.

Mobile electronic devices described herein include, but are not limited to smartphones, iPhones, Android phones, iPads, notebook computers, computers built into a car, and mobile devices dedicated to performing NFC communications. Mobile devices may include a processor, and a memory. Mobile devices may also or alternatively include a field programmable gate array (FPGA), or a an application specific integrated circuit (ASIC).

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the figures and/or descriptions included herein.

A private payment network as described herein includes, but is not limited to a computer and a computer server.

Figure 1:
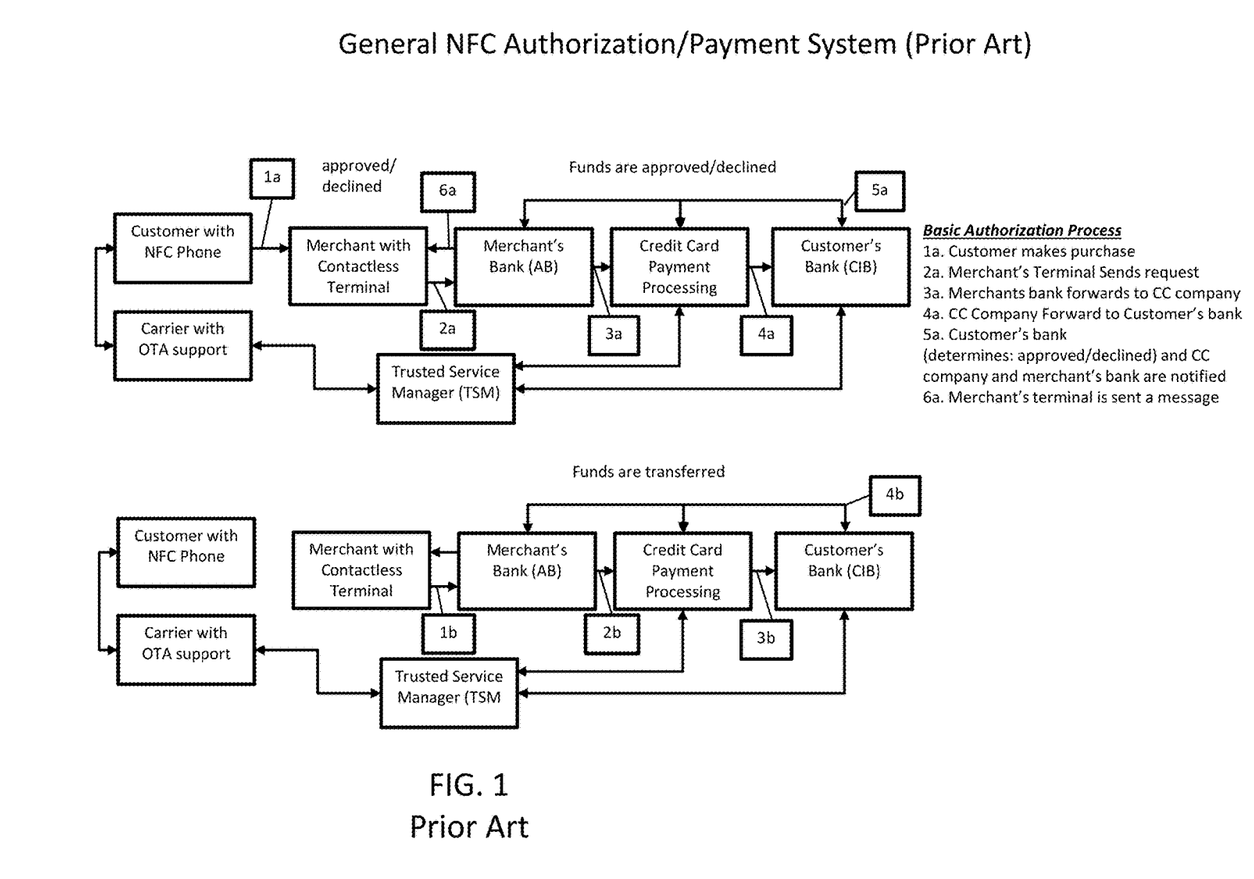
FIG. 1 illustrates a prior art basic authorization process and a basic prior art payment process.

FIG. 1 illustrates a prior art basic authorization process and a basic prior art payment process. FIG. 1 illustrates two separate flow charts, a first flow chart of a prior art basic authorization process, and a second flow chart of a basic prior art payment process. The basic authorization process begins with a customer with a phone that supports NFC communications sending a purchase order 1a to a merchant with a contactless terminal. The merchant with the contactless terminal then sends a request 2*a* to the merchant bank. Next the merchant bank forwards credit card information 3*a* provided with the purchase order to a credit card payment processing center. The credit card payment processing center then forwards the credit card information 4*a* to the customer bank, and the customer bank approves or declines the purchase 5*a*. Next a message is sent back to the merchant 6*a* indicating that the purchase has been approved or declined.

FIG. 1 also indicates that funds are approved or declined using a combination of the merchant bank, the credit card payment processing center, and the customer bank. FIG. 1 also depicts alternate communication pathways for performing the transactions. The alternative communication pathway includes a trusted service manager (TSM) communicating with the customer bank and with the credit card payment processing center. The TSM is an entity that serves a trusted intermediary between mobile devices, networks that service mobile devices, and software applications. The TSM securely coordinates payments from a financial institution to a merchant that have been authorized by a mobile device. The alternate pathway also includes a carrier with over the air (OTA) support communicating with the TSM and with the customer phone. Examples of a carrier with OTA support are cellular companies like Verizon, AT&T, and T-Mobile. The basic authorization process may be performed using older phone lines or it may be performed using modern wireless cellular networks.

The basic payment process of FIG. 1 illustrates the merchant sending a settlement request 1*b* to the merchant bank, the merchant bank then sends a settlement request 2*b* to the customer bank. Next the customer bank transfers funds to the merchant bank 4*b*. FIG. 1 shows that communications between the merchant bank, the credit card payment processing center, and the customer bank are used to transfer from the customer bank to the merchant bank. The basic payment flow chart also shows a customer phone communicating with a carrier with OTA support, and with a TSM. Here the TSM also communicates with the credit card payment system and with the customer bank.

Figure 2:
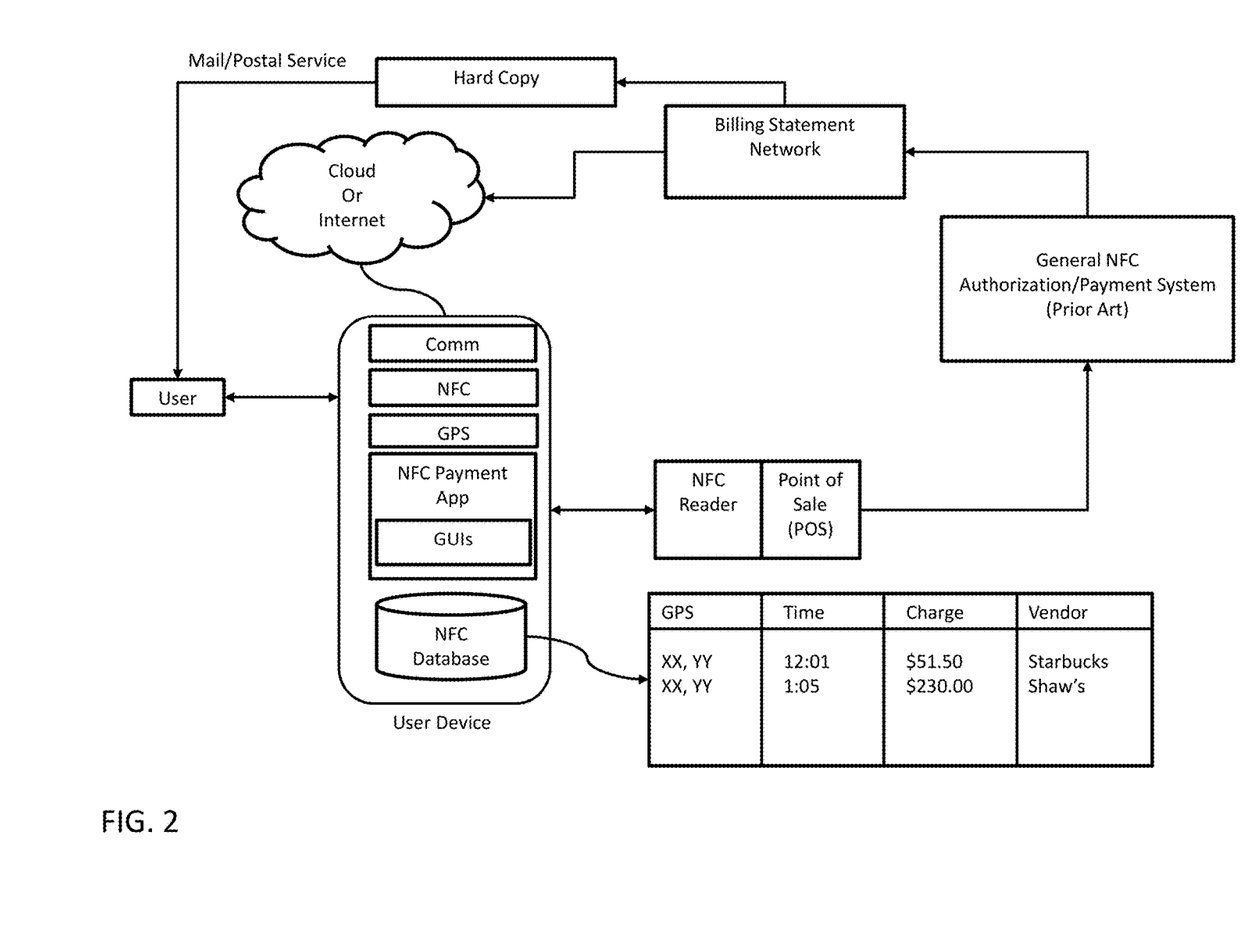
FIG. 2 illustrates a user device communicating with a billing statement network over the cloud or internet.

FIG. 2 illustrates a user device communicating with a billing statement network over the cloud or internet. The user device is depicted as communicating with a general NFC payment authorization system over a point of sale terminal. FIG. 2 also depicts the general NFC payment authorization system communicating with the billing statement network. The general NFC payment authorization system of FIG. 2 may be the same prior art general NFC payment authorization system depicted in FIG. 1. FIG. 2 also depicts a user interacting with the user device and the user receiving a hard copy of a statement from the billing statement network that was mailed to the user.

The user device includes a communication interface, a NFC data communication interface, a global positioning system (GPS), a NFC payment application (App) that includes a graphical user interface (GUI), and an NFC database. The NFC payment application may communicate with the NFC payment authorization system over the NFC data communication information and over a NFC data communication interface at the point of sale terminal.

The communication interface communicating over the cloud or internet may be any communication interface, including but not limited to Bluetooth, Wi-Fi (802.11), or a cellular 3G-4G LTE network. Other communications networks, protocols, and standards may be used. The NFC database is depicted as including historical information relating to financial transactions that the user has previously performed. For example, the database includes a transaction for the amount of $51.50 occurred at Starbucks at 12:01 pm at a GPS location (XX, YY).

In operation, the user device may communicate using NFC data communications with the point of sale terminal that in turn may communicate with the general payment authorization system that may communicate with the billing statement network when processing a transaction. The billing statement network may then communicate with the user device over the cloud or internet a communication relating to the transaction. The billing statement network may also arrange for a hard copy statement to be mailed to the user after the transaction is complete.

Figure 3:
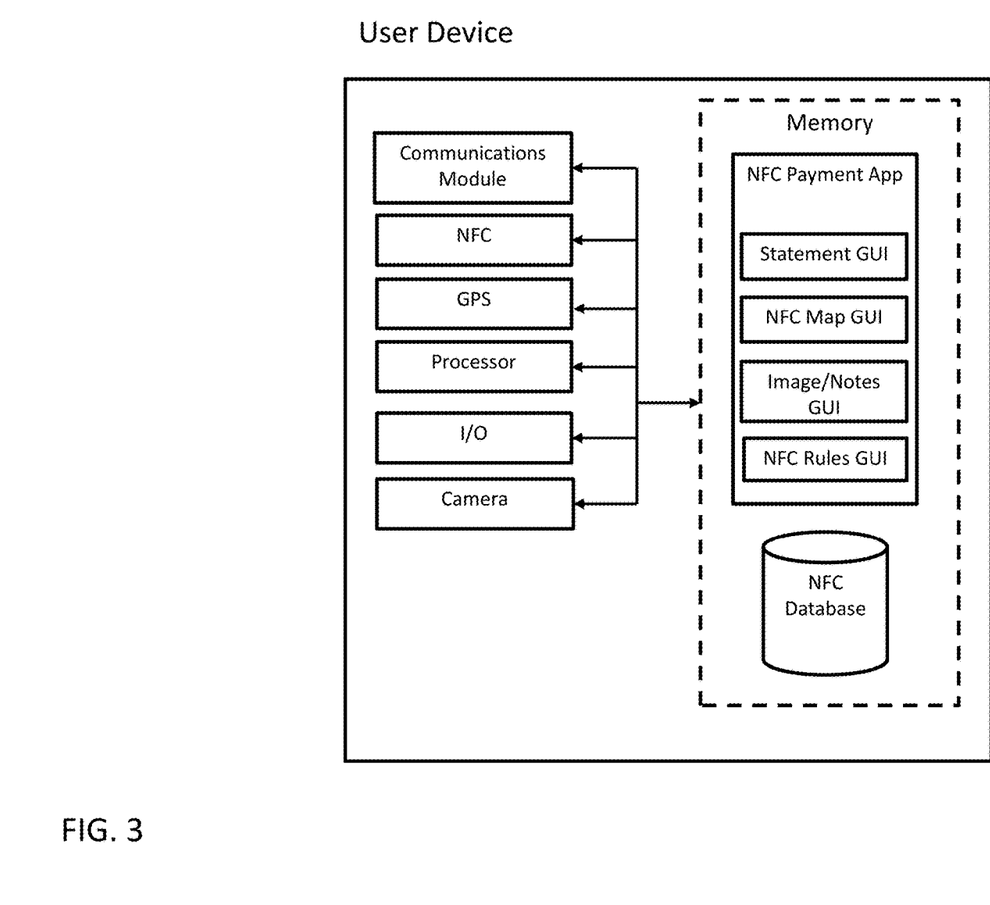
FIG. 3 illustrates a user device.

FIG. 3 illustrates a user device. The user device is depicted as including a memory, a communications module, an NFC data communication interface, a GPS system, a processor, an input/output (I/O) interface, and a camera connected with a communication bus. The memory in the user device is depicted as including an NFC payment App, and an NFC database. The NFC payment App includes a statement GUI, a NFC map GUI, an image/notes GUI, and a NFC rules GUI. The various GUIs depicted in FIG. 3 may be used by a user to order or review a statement, review a map, make notes or images, or review NFC rules.

Figure 4:
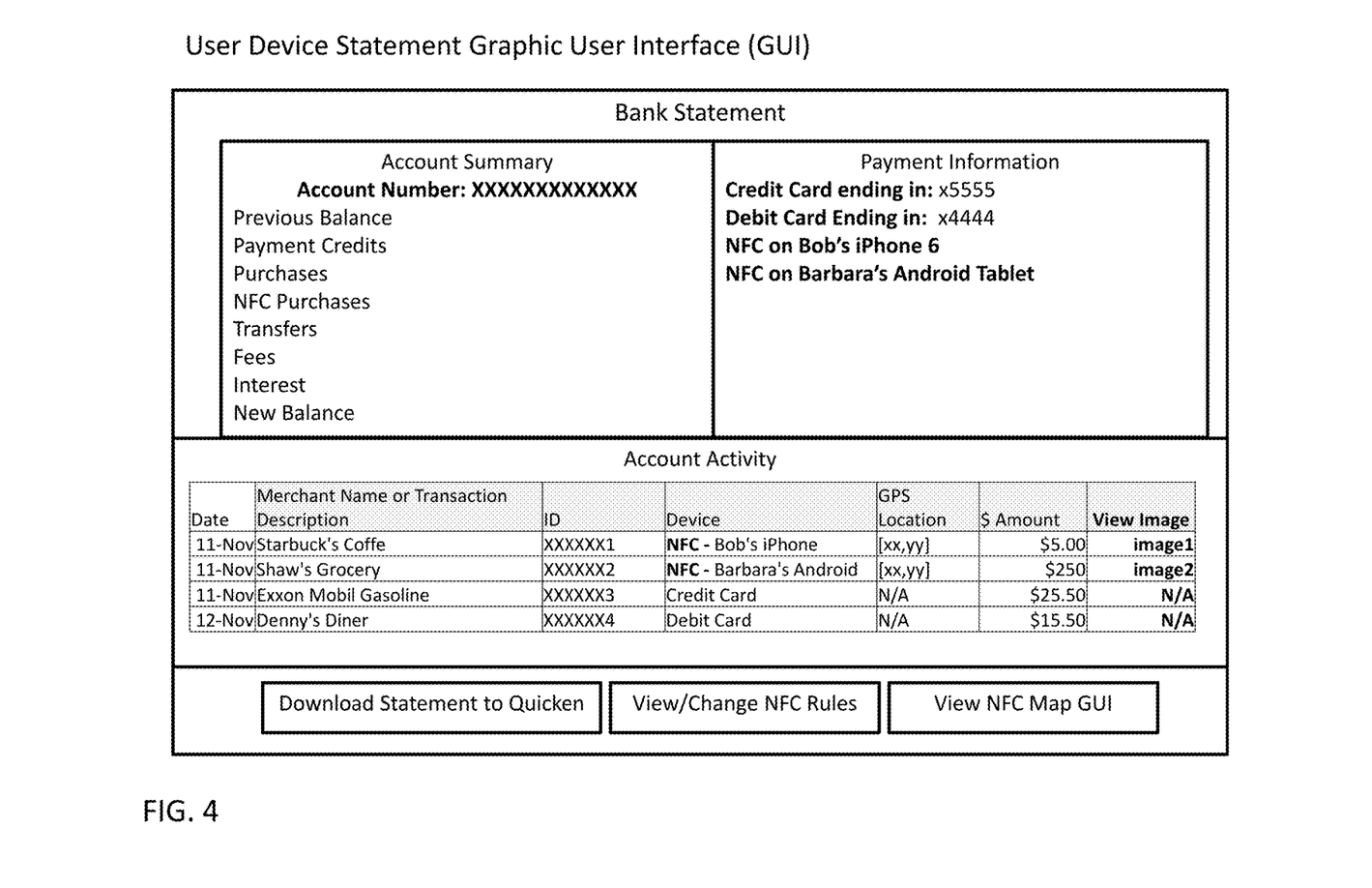
FIG. 4 illustrates a bank statement graphical user interface (GUI) that may be displayed on a display at a user device.

FIG. 4 illustrates a bank statement graphical user interface (GUI) that may be displayed on a display at a user device. The bank statement includes an account summary information, payment information, account activity information, and several selection boxes. The selection boxes depicted include download statement to quicken, view/change NFC rules, and view an NFC map GUI.

The account summary includes an account balance, credits, purchase information, NFC purchase history information, transfer information, interest earned, and a new balance. The payment information includes a partial credit card number, a partial debit card number, and previous payment history (i.e., NFC on Bob iPhone 6). The account activity includes a plurality of fields that include: a transaction date, a merchant name, a transaction identifier (ID), a device name, a GPS location, a transaction amount, and an optional image. The statement tracks transactions performed at various merchants and cross references a device name that was used to perform the transaction with other information. Image information may be a photo taken at the time that the transaction occurred. An example transaction occurred on November 12 at Dennys diner using a debit card for an amount of $15.50. Since this transaction was processed using a debit card, no GPS location data or image data is available. In contrast, a second example transaction that occurred on November 11 at Shaw grocery was processed using a NFC communication interface on Barbara Android phone. This second example transaction occurred at GPS location (xx, yy) and includes image data.

Statement information may be downloaded to quicken accounting software when the download statement to quicken selection box is selected. A user may view or change rules that enable, disable, or configure NFC communications at the user device. A user may also view the NFC map GUI by selecting the view NFC map GUI selection box.

Figure 5:
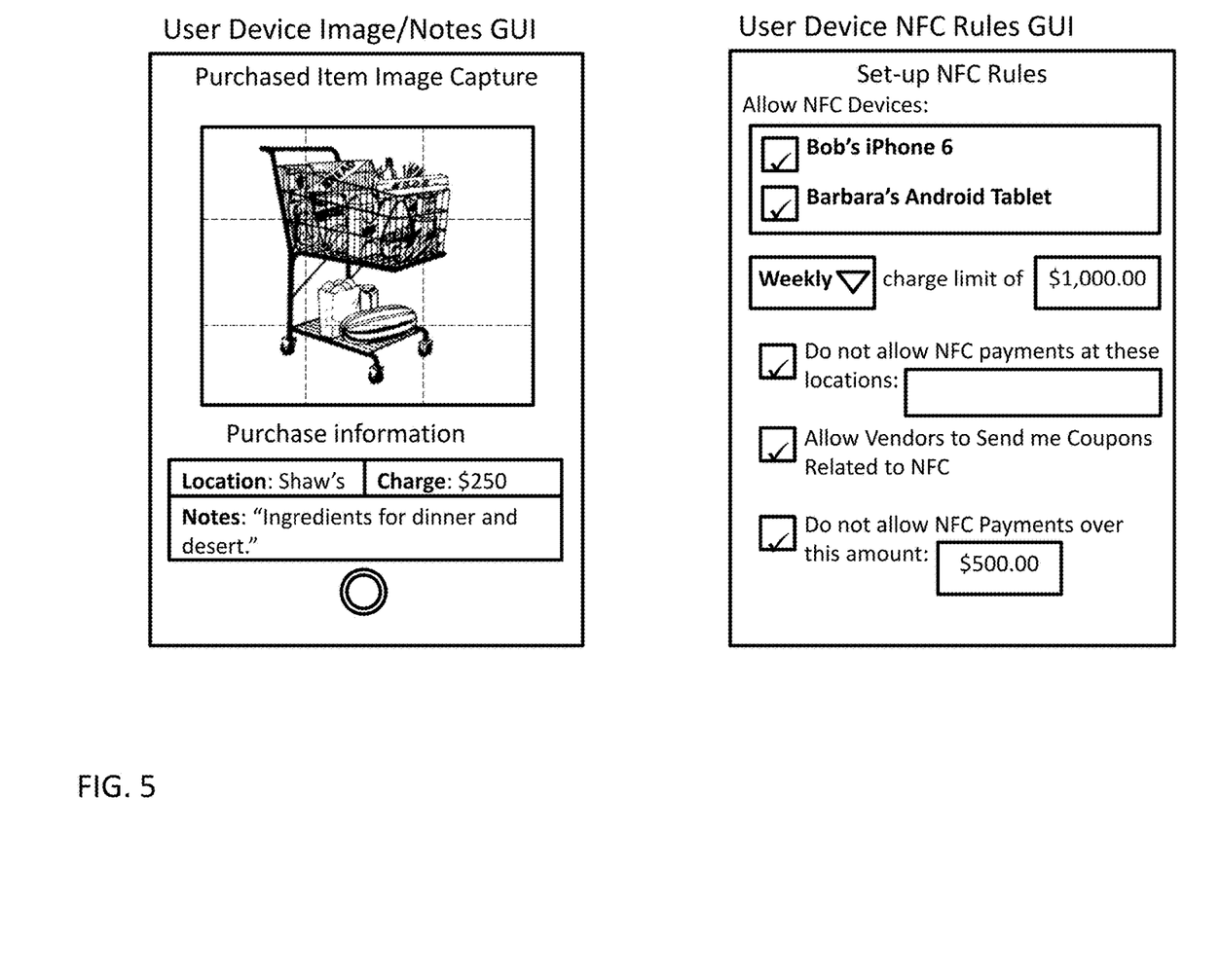
FIG. 5 illustrates an image captured by a user device that may be displayed in an image/notes GUI.

FIG. 5 illustrates an image captured by a user device that may be displayed in an image/notes GUI. FIG. 5 also depicts an example of a user device NFC rules GUI. The image displayed in the user device image/notes GUI is a grocery cart full of groceries. Purchase information in the image/notes GUI indicates that the groceries were purchased at Shaw groceries, a charge of $250.00, and a note of "ingredients for dinner and desert." The button depicted in the image/notes GUI may be used to acquire an image and store that image in a database.

The user device NFC rules GUI indicates that allowed NFC devices are Bob iPhone 6, and Barbara Android tablet. FIG. 5 depicts a charge limit of $1000.00 per month rule. This rule may limit NFC charges of a user configured amount spanning a time selected by the user in the GUI. The rules GUI also depicts selection boxes "do not allow NFC payments at these locations," "allow vendors to send me coupons related to NFC," and "do not allow NFC payments over this amount $500.00." FIG. 5 also includes an entry box that may be used to identify location where NFC payments should not be allowed. Thus, a user of the user device may define rules regarding how and where NFC data communications may be used by one or more user devices.

Figure 6:
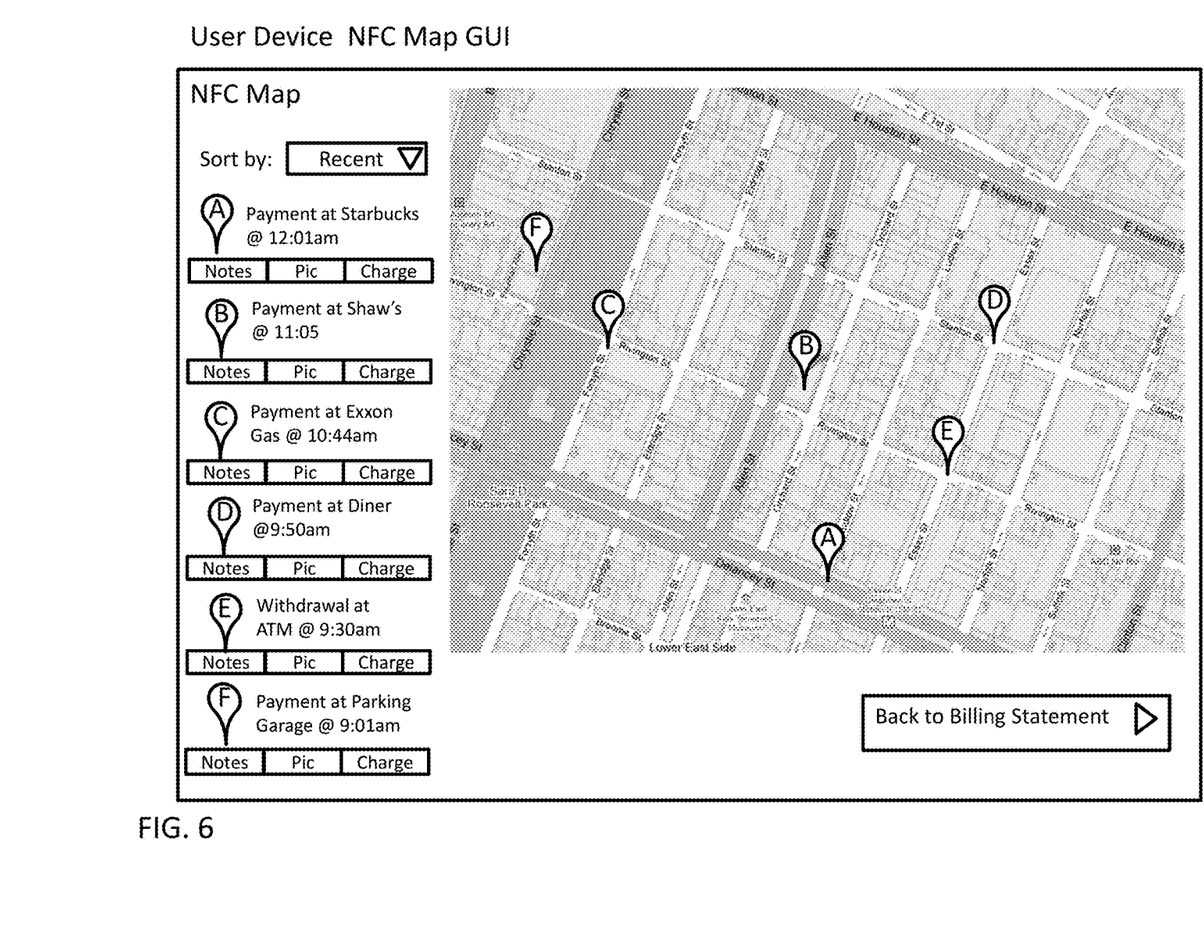
FIG. 6 illustrates a map that identifies locations where a user made a purchase using NFC data communications in a user device NFC map GUI.

FIG. 6 illustrates a map that identifies locations where a user made a purchase using NFC data communications in a user device NFC map GUI. FIG. 6 depicts numerous recent purchase locations (A-F). FIG. 6 depicts a vendor name, and a time when each purchase was made. Each entry in the map is also cross referenced to notes that may have been entered, to a picture (pic) that may have been taken at the purchase location, and to a charge charged at the location. For example, location D identifies that a payment was made at a diner at 9:50 am. By selecting a notes, a pic, or a charge selection box under the location identifier D, a user may view a note, view a picture, or review a charge made at location D. The map also includes selection boxes sort by and back to billing statement. Selection box "sort by" identifies that only recent purchase are displayed in the map. Selection box "back to billing statement," when selected will allow a user to go back and view a billing statement, which may be like the billing statement depicted in FIG. 4.

Figure 7:
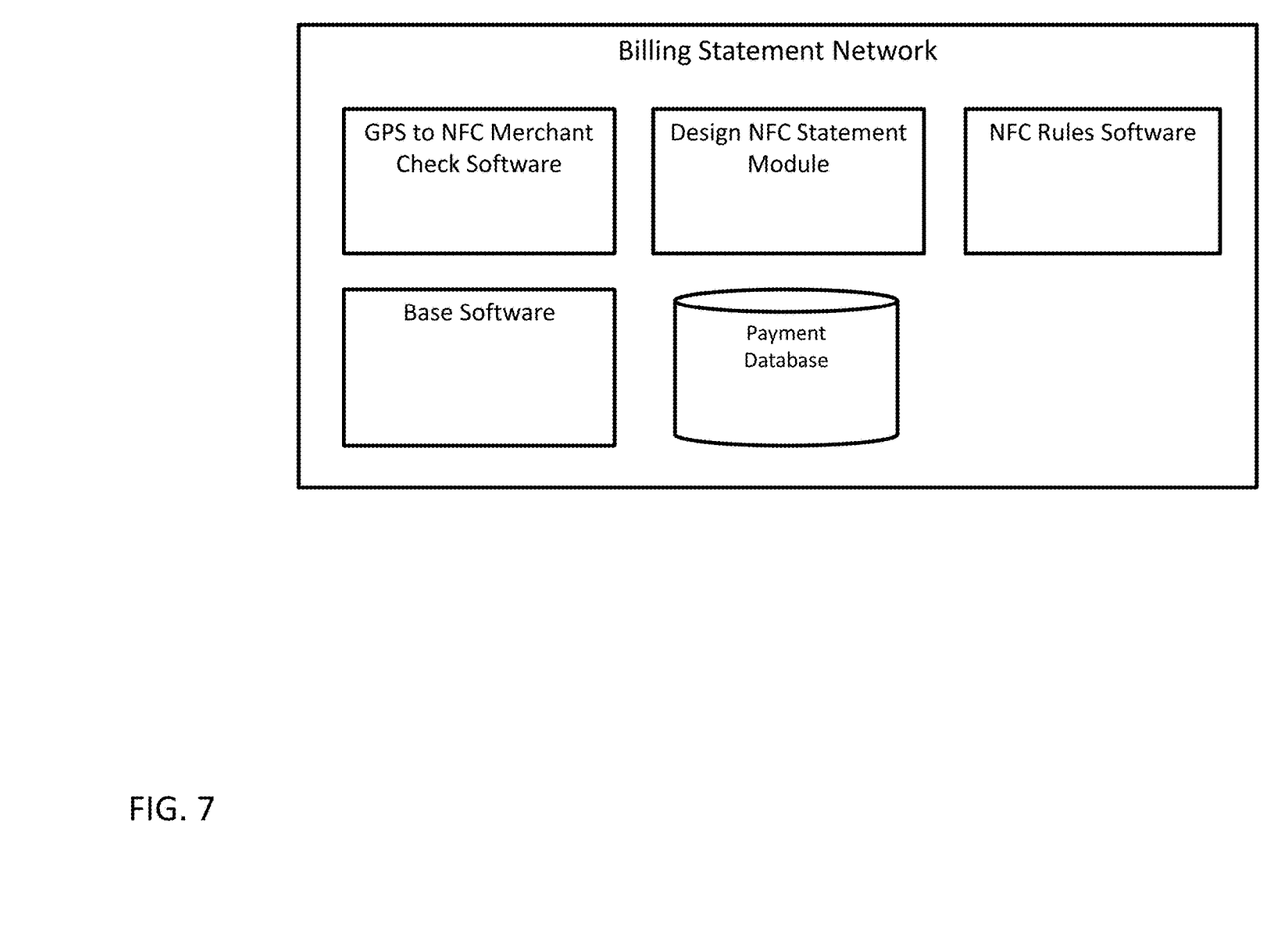
FIG. 7 illustrates a billing statement network.

FIG. 7 illustrates a billing statement network. The billing statement network in FIG. 7 includes a GPS to NFC merchant check software, base software, design NFC statement module, a NFC rules software, and a payment database.

The GPS to merchant check software may check the GPS location of a user device and a merchant to see if they are in the same location when authorizing a purchase. The base software in FIG. 6 provides the billing statement network with basic billing functions.

The design statement module is a software module that may allow a user to customize how their billing statements appear. For example, a user may configure their statement to include an icon of an image acquired during purchases in the statement when an image is available. The NFC rules software is a software module that may enforce rules setup by a user of the user device. The rules GUI as discussed in respect to FIG. 5 provides examples of rules that may be enforced by the NFC rules software.

Finally, the payment database in FIG. 7 is a database that includes purchase information, such as the purchase information discussed in respect to FIGS. 2, 5, and 6.

Figure 8:
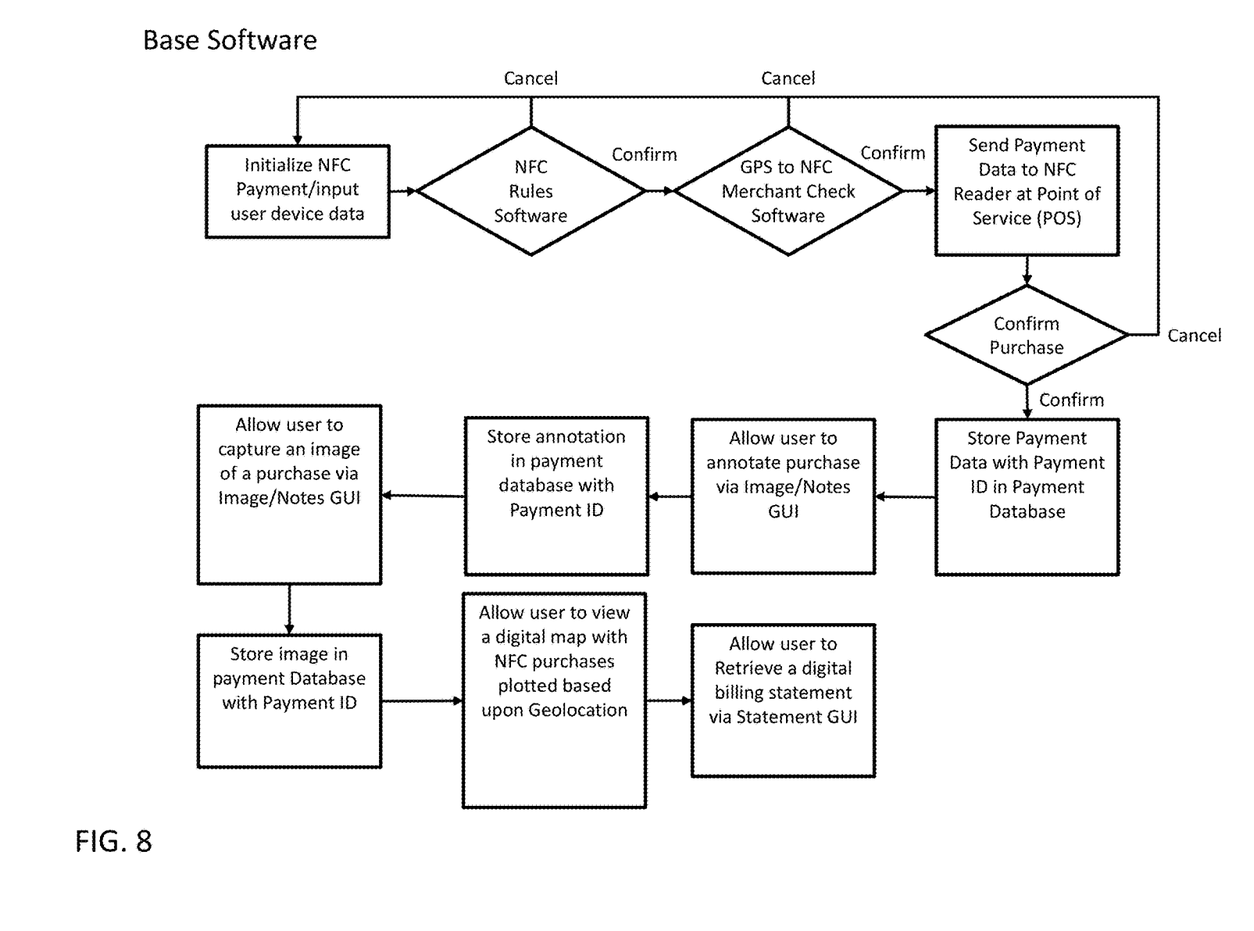
FIG. 8 illustrates an exemplary flow chart of functionality that may be included in a base software of a billing statement network.

FIG. 8 illustrates an exemplary flow chart of functionality that may be included in a base software of a billing statement network. A first step in the flow chart is a step that may enable NFC payments inputs to be input (initialized) in the base software. The second step in FIG. 8 is a first determination step, this step determines whether a transaction input into the base software conforms to rules in set in the rules software. When the transaction does conform to the rules, the flow chart moves to a third step in the flow chart, otherwise the transaction is cancelled.

The third step in FIG. 8 is a second determination step, where a geo-location of the merchant is checked against a geo-location of the user device. When the geo-locations match, the flow chart proceeds to a fourth step in the flow chart, otherwise the transaction is cancelled (as the transaction appears to be a fraudulent transaction). In step four of the flow chart payment data a user device sends payment information over a point of sale terminal to a point of sale service (POS). A geo-location may be a street address or correspond to a latitude and a longitude.

Next in a fifth step of the flowchart a third determination is determined. The third determination step may determine that the purchase should be processed. When it is confirmed that the purchase should be processed, program flow flows to a sixth step in FIG. 8, otherwise the transaction is cancelled. In the sixth step of the flowchart payment data and a payment identifier (ID) are stored in a payment database. Then in a seventh step, a user may be allowed to annotate the purchase and enter an image using the image/notes GUI in FIG. 5. In an eight step of FIG. 8 the annotation is stored in the payment database.

Next in step nine of the flow chart as illustrated in FIG. 8, the user is allowed to capture an image that may be stored in the database and cross referenced to the purchase, to the purchase ID, and to any notes or images captured relating to the purchase. After the image is captured it may be stored in the payment database in step ten of the flow chart.

In an eleventh step of the flow chart, the user may be allowed to view NFC purchases made on a digital map displayed in a GUI at the user device. The map may include the geo-location where the purchase was made. Finally, in a twelfth step of the flow chart, a user may retrieve a billing statement and view that statement in a statement GUI.

Figure 9:
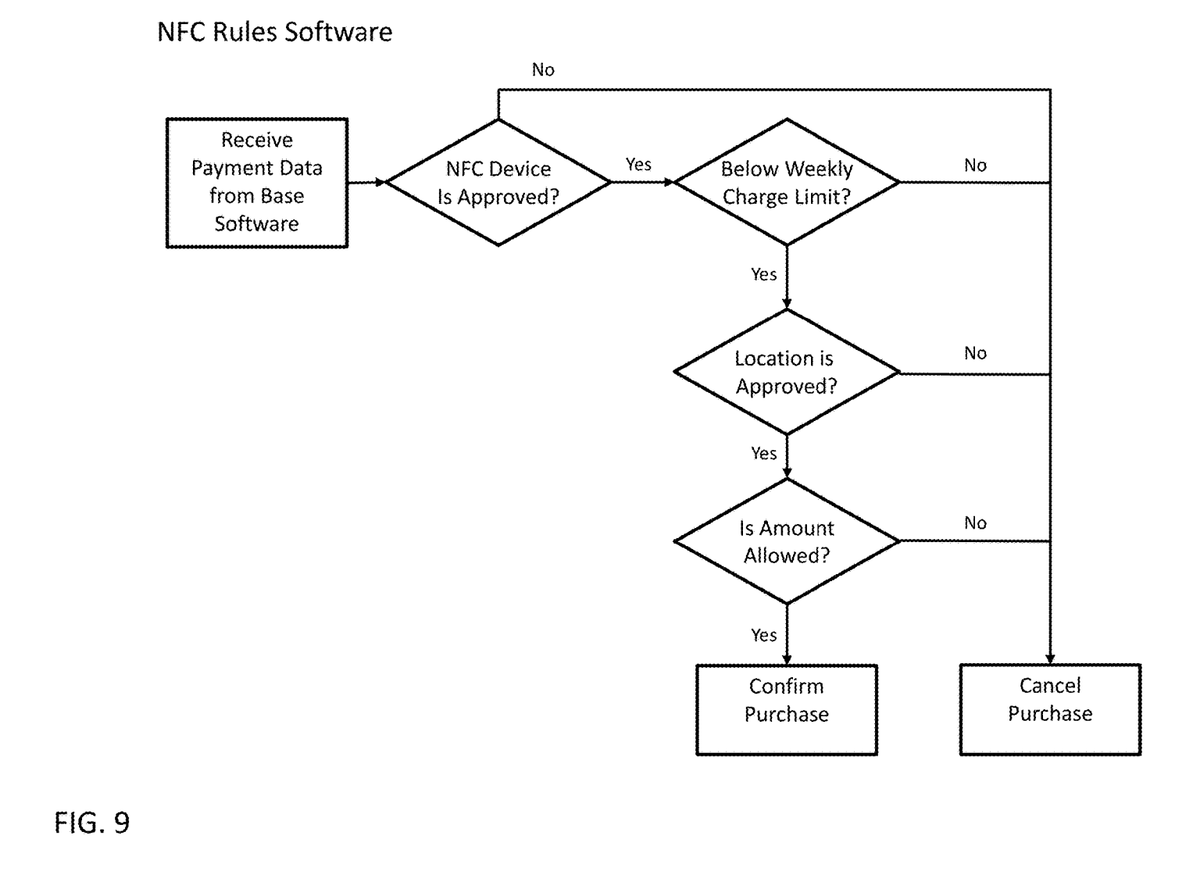
FIG. 9 illustrates an exemplary flow chart of NFC rules software.

FIG. 9 illustrates an exemplary flow chart of NFC rules software. A first step in the flow chart may receive payment data from base software at the billing statement network of FIG. 7. A second step in the flow chart is a determination step where the NFC device may be approved to execute a transaction. When the NFC device may perform a transaction, program flow flows to a third step in the flow chart, otherwise the transaction moves to a step where the purchase is cancelled. The third step in the flow chart determines whether the purchase history associated with the mobile device is below a weekly charge limit, when yes, program flow moves to a fourth step in the flow chart, otherwise program flow moves to the step where the purchase is cancelled.

The fourth step of the flow chart determines whether the location where the purchase is being performed is an approved location, when yes, program flow moves to a fifth step of the flow chart. When the location is an approved location, program flow moves to a fifth step of the flow chart, otherwise program flow moves to the step where the purchase is cancelled. The fifth step in the flow chart determines whether the amount or cost of the purchase is an allowed amount. When the amount is an allowed amount, program flow flows to a sixth step in the flow chart where the purchase is confirmed. When the amount is not allowed program flow moves from the fifth step to the step where the purchased is cancelled.

Figure 10:
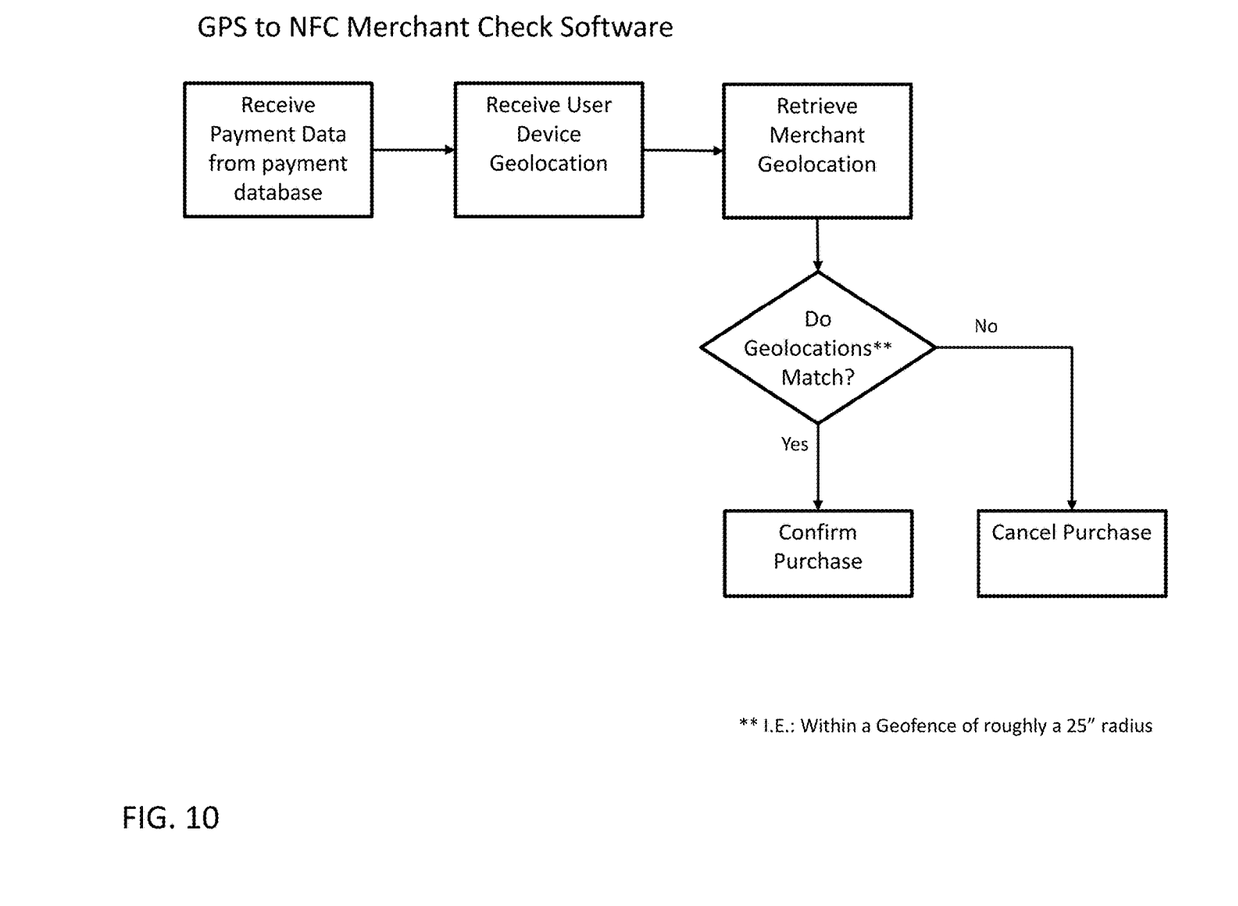
FIG. 10 illustrates an exemplary flow chart of GPS to NFC merchant check software.

FIG. 10 illustrates an exemplary flow chart of GPS to NFC merchant check software. FIG. 10 begins with a first step where payment data is received from the payment database at the billing statement database. In a second step of the flow chart the geo-location of the user device is received, and then the geo-location of the merchant is retrieved in a third step of the flow chart. Next the merchant check software may determine whether the geo-location of the user device matches the geo-location of the merchant.

When the geo-location match, the purchase is confirmed in a fifth step of the flow chart. When the geo-locations do not match, the purchase is cancelled in a sixth step of the flow chart.

Figure 11:
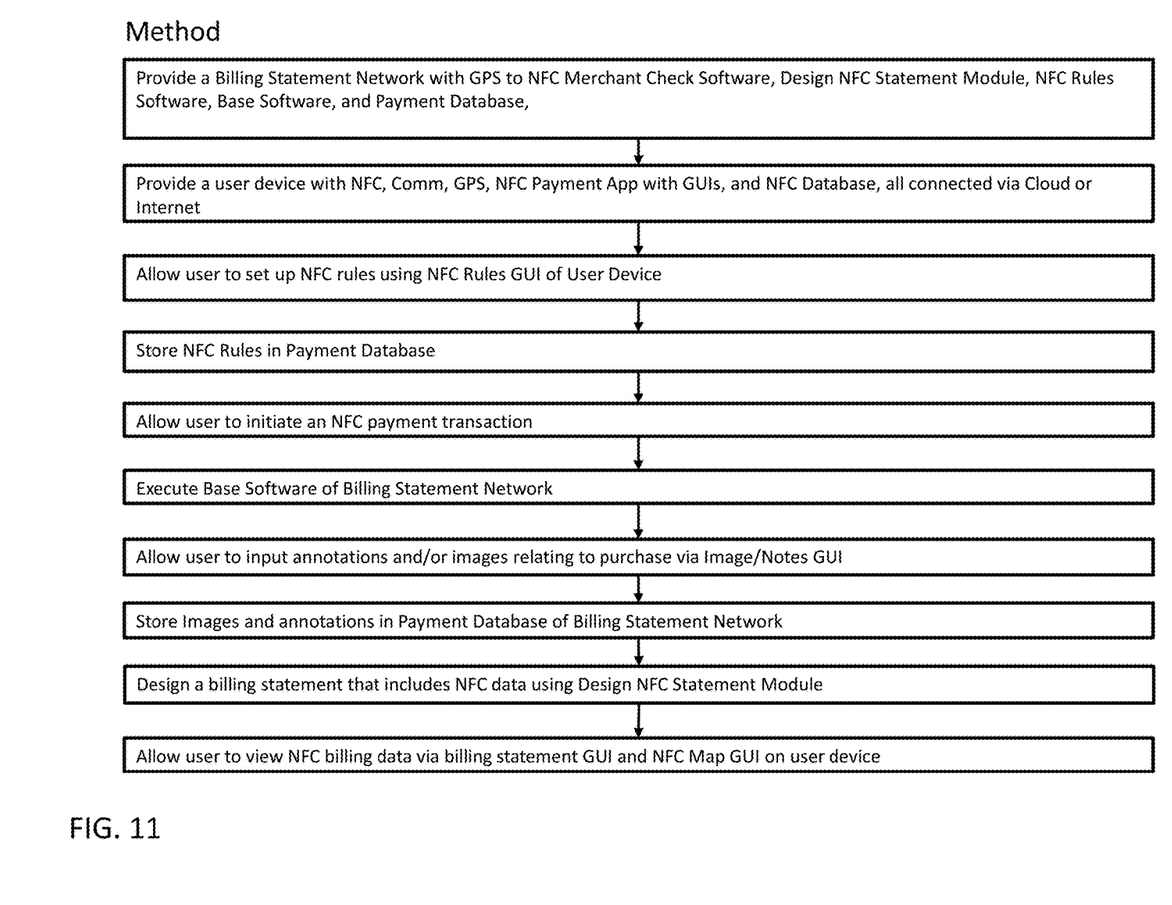
FIG. 11 illustrates an exemplary method corresponding to the present invention.

FIG. 11 illustrates an exemplary method corresponding to the present invention. The method begins with a first providing step where a billing statement network may be provided with GPS merchant check software, design NFC statement module software, NFC rules software, base software, and a payment database.

The second step of the flow chart is also a providing step where a user device may be provided with a NFC communication interface, another communication interface, a GPS system, an NFC payment App and GUIs, and an NFC database. In the second step of the flow chart, a user device may communicate over the cloud or internet with the billing statement network of FIG. 2.

The third step of the flow chart may allow a user to setup NFC rules in the billing statement network over a GUI displayed on a display at the user device. Then in a fourth step of the flow chart the NFC rules may be stored in a payment database at the billing statement network. Next in a fifth step of the flow chart, the user may be allowed to initiate an NFC payment transaction.

The sixth step of the flow chart is where base software at the billing statement network may be executed. Then in a seventh step, the user may be allowed to input annotations or images relating to the purchase over an image/notes GUI at the user device. The eighth step of the flow chart is where the images and/or the annotations input in step seven may be stored in the payment database of the billing statement network.

In step nine of FIG. 11, a user of the user device may design a billing statement by interacting with the billing module software at the billing statement network. Here again this interaction may be performed over a GUI at the user device.

Finally, in step ten of the flow chart a user may be allowed to view a billing statement sent from the billing statement network. The statement may be viewed over a billing GUI or a map GUI on the user device.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for near field communication (NFC)-based payment tagging, the method comprising:
receiving information regarding a requested NFC-based transaction involving a user device, the information received via an NFC interface of the user device;
receiving annotation input associated with the requested NFC transaction at the user device, wherein the annotation input is entered by a user via a user interface of the user device;
identifying a current location of the user device via a global positioning system (GPS) at a time of the requested NFC-based transaction;
transmitting the received information, the received annotation input, and the identified current location over a communication network to a network server, wherein the network server further identifies a current location of a merchant associated with the requested NFC-based transaction at a time of the requested NFC-based transaction, and conditions approval of the requested NFC-based transaction on the current location of the user device matching the current location of the merchant;
receiving a request for an NFC-based transactions statement associated with an account of the user device, the request for the NFC-based transactions statement sent to the network server; and
displaying the requested NFC-based transactions statement on the screen of the user device based on a response sent from the network server, wherein the displayed NFC-based transactions statement includes at least the received information regarding the requested NFC-based transaction and the associated annotation input.

2. The method of claim 1, wherein the requested NFC-based transactions statement includes NFC-based transactions that are associated with different fund sources.

3. The method of claim 1, wherein displaying the requested NFC-based transactions statement comprises generating a display of a geographic map that indicates the location associated with each NFC-based transaction in the requested NFC-based transactions statement.

4. The method of claim 1, further comprising cross-referencing the location with the associated annotation input and the received information regarding the requested NFC-based transaction.

5. The method of claim 1, wherein the annotation input includes at least one of an image taken by a camera of the user device and text notes entered via the user interface of the user device.

6. The method of claim 1, wherein an appearance of the displayed NFC-based transactions statement is customizable based on user input.

7. A device for near field communication (NFC)-based payment tagging, the device comprising:
an NFC interface that receives information regarding a requested NFC-based transaction involving a user device;
a global positioning system (GPS) that identifies a current location of the user device at a time of the requested NFC-based transaction;
a user interface that receives annotation input associated with the requested NFC transaction, wherein the annotation input is entered by a user;
a wireless communication interface that:
transmits the received information, the received annotation input, and the identified current location over a communication network to a network server, wherein the network server further identifies a current location of a merchant associated with the requested NFC-based transaction at a time of the requested NFC-based transaction, and conditions approval of the requested NFC-based transaction on the current location of the user device matching the current location of the merchant, and sends a request for an NFC-based transactions statement associated with an account of the user device to the network server; and a screen that displays the requested NFC-based transactions statement based on a response sent from the network server, wherein the displayed NFC-based transactions statement includes at least the received information regarding the requested NFC-based transaction and the associated annotation input.

8. The device of claim 7, wherein the requested NFC-based transactions statement includes NFC-based transactions that are associated with different fund sources.

9. The device of claim 7, wherein the screen displays the requested NFC-based transactions statement by generating a display of a geographic map that indicates the location associated with each NFC-based transaction in the requested NFC-based transactions statement.

10. The device of claim 7, wherein the screen further cross-references the location with the associated annotation input and the received information regarding the requested NFC-based transaction.

11. The device of claim 7, wherein the annotation input includes at least one of an image taken by a camera of the user device and text notes entered via the user interface of the user device.

12. The device of claim 7, wherein an appearance of the displayed NFC-based transactions statement is customizable based on user input entered via the user interface.

13. A non-transitory computer-readable storage medium, having embodied thereon a program executable by a processor to perform a method for near field communication (NFC)-based payment tagging, the method comprising:

receiving information regarding a requested NFC-based transaction involving a user device, the information received via an NFC interface of the user device;

receiving annotation input associated with the requested NFC transaction at the user device, wherein the annotation input is entered by a user via a user interface of the user device;

identifying a current location of the user device via a global positioning system (GPS) at a time of the requested NFC-based transaction;

transmitting the received information, the received annotation input, and the identified current location over a communication network to a network server, wherein the network server further identifies a current location of a merchant associated with the requested NFC-based transaction at a time of the requested NFC-based transaction, and conditions approval of the requested NFC-based transaction on the current location of the user device matching the current location of the merchant;

receiving a request for an NFC-based transactions statement associated with an account of the user device, the request for the NFC-based transactions statement sent to the network server; and displaying the requested NFC-based transactions statement on the screen of the user device based on a response sent from the network server, wherein the displayed NFC-based transactions statement includes at least the received information regarding the requested NFC-based transaction and the associated annotation input.

14. The method of claim 1, wherein the displayed NFC-based transactions statement further includes a different NFC-based transaction that is associated with different annotation input.

15. The method of claim 1, wherein approval of the requested NFC-based transaction is further based on stored rules in memory.

16. The method of claim 15, wherein the stored rules collectively apply to the user device and to at least one other NFC-capable user device.

17. The method of claim 16, wherein the displayed NFC-based transactions statement further includes a different NFC-based transaction that is associated with the other NFC-capable user device.

18. The method of claim 15, wherein at least one of the rules specifies a limit on a total amount of NFC-based transactions allowed within a defined time period.

19. The method of claim 15, wherein at least one of the rules specifies a location where NFC-based transactions are not allowed.

20. The method of claim 15, wherein at least one of the rules specifies a limit on a total amount of the requested NFC-based transaction.

* * * * *